Aug. 26, 1958  E. H. SOUTHWELL  2,849,144
FABRICATED CONTAINER
Filed Aug. 22, 1955

EDWARD H. SOUTHWELL
INVENTOR.

BY R. E. Giangue

ATTORNEY.

United States Patent Office 2,849,144
Patented Aug. 26, 1958

2,849,144

FABRICATED CONTAINER

Edward H. Southwell, Los Angeles, Calif.

Application August 22, 1955, Serial No. 529,851

2 Claims. (Cl. 220—4)

The present invention relates to a container and more particularly to a bottle which is preferably fabricated from suitable plastic material.

Bottles of the type presently in use are ordinarily constructed of glass or suitable plastic material and for example a glass bottle is formed in a mold as a single piece casting, whereas a plastic bottle is usually formed by an injection molding process. It will be appreciated therefore, that a mold or die must be provided for each size bottle manufactured and considering the cost of tooling of this type the cost of the bottle, especially if it is of an odd size, must necessarily reflect this high tooling cost. The bottle of the present invention is formed from tubular stock material with a suitable top section and bottom section fixed in fluid tight relationship to the opposite ends of the tubular body stock. It will be readily apparent, therefore, that a bottle can be formed which besides being pleasing in appearance is cheaper to manufacture, is capable of being manufactured in various sizes using substantially the same tooling, and which utilizes common tubular stock material which is readily available.

It is, therefore, an object of the present invention to provide an improved container.

A further object of the present invention is to provide an improved container which is fabricated from suitable components formed from suitable plastic material, one of these components being formed from tubular stock material.

Another object of the present invention is to provide a container which can be manufactured in various sizes without any substantial change in tooling.

Still another object of the present invention is to provide a container which is cheaper to manufacture, which is lighter than containers presently in use so as to save shipping costs, which is extremely durable, and which is pleasing in appearance.

Other objects and advantages of the present invention will be readily apparent to those skilled in the art upon perusal of the following description and drawings.

In the drawings, Fig. 1 is a perspective view of the present invention showing the lid vertically disposed with respect to the container.

Figure 1:
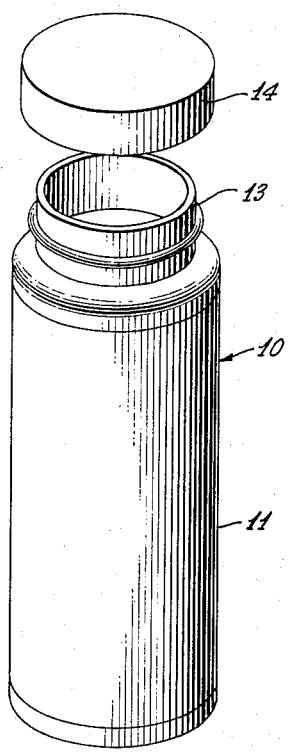
Figure 2:
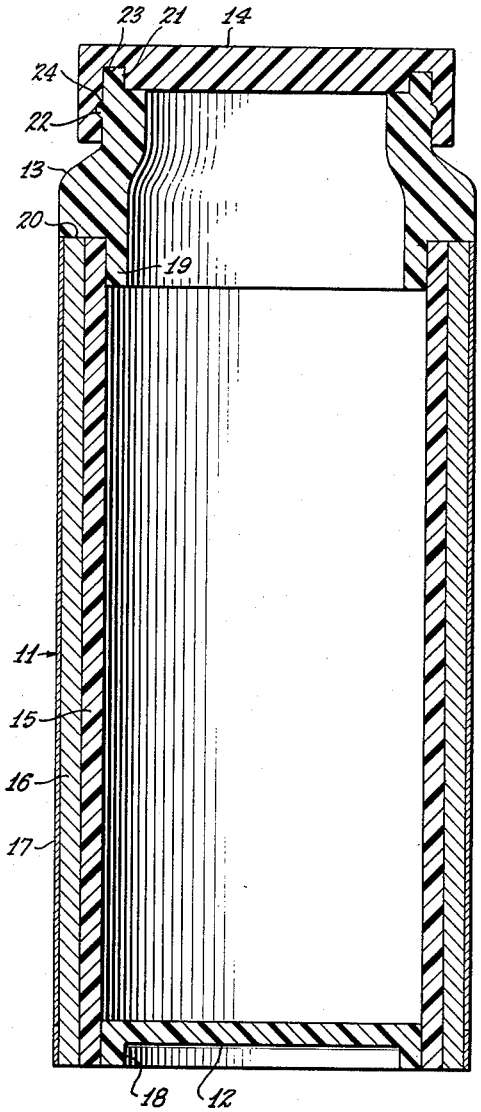
Fig. 2 is a vertical sectional view of the container shown in Fig. 1, slightly enlarged, showing the lid in its closed position on the container.

Referring to Figs. 1 and 2 of the drawings, the number 10 broadly designates a container embodying the principles of the present invention. The container consists of a tubular body portion 11, a bottom insert 12 and a top insert 13, a cap or lid 14 being associated with top insert 13 as will be more fully appreciated hereinafter.

The body portion 11 in turn consists of a section of tubular plastic material 15 which can be either polyethylene or polystyrene or any other material chemically suitable to the fluid intended to be carried in the container. Cemented to the outer circumferential surface of section 15 by means of any suitable adhesive is a body stock 16, preferably formed of paper and cemented to the body stock 16 is a label 17 which can be formed either of aluminum or paper or of any other like type material.

In a typical instance, the body portion 11 may consist of a plastic section 15 having a wall which is approximately .009 to .016 inch in thickness, a body stock formed of 16 point paper which is aproximately .009 inch in thickness, and a label which is composed of aluminum laminated to a kraft paper and which is approximately .00335 inch in thickness.

The bottom insert 12 is also preferably formed of plastic such as polystyrene or polyethylene and is shaped to fit snugly in the body 11 adjacent one end thereof. The insert has a peripheral rim 18 which is suitably fixed to the inner periphery of section 15 so that the insert is in fluid tight relationship with respect to body 11. The rim 18 can be sealed to section 15 by heat, for instance, if the plastic material is polyethylene, or if the plastic is polystyrene, the rim can be welded to the section 15 by acetone or any other suitable plastic solvent. It will be appreciated, however, that any suitable means can be employed for fixing the insert 12 in telescoped fluid tight relationship in section 15 adjacent the one end thereof.

The top insert 13, also preferably formed of a plastic material such as polyethylene or polystyrene, has a neck 19 which is shaped to be telescoped and snugly received in the other end of section 15. The outer peripheral surface of neck 19 is sealed to the inner peripheral surface of section 15 by heat or by a suitable plastic solvent such as acetone, in preferably the same manner as described with respect to rim 18 of insert 12. The insert 13 also has a shoulder 20 which is positioned in abutting relationship with the top edge of body 11 and is suitably fixed thereto by means of a suitable adhesive. It will be appreciated that the adhesive besides fixing the shoulder 20 to the body 11 protects the edges of the paper body stock and label from becoming frayed. The top insert is tubular in shape and the outer peripheral surface is formed so as to be flush with the outer peripheral surface of body 11 and shaped in any suitable manner or shaped to conform with the shape of existing container designs. The exit edge of insert 13 has a rim 21 formed thereon and a peripheral bead formed adjacent thereto.

The lid 14 has a groove 23 which is shaped to snugly receive rim 21 and a groove 24 which receives bead 22 so as to lock lid 14 to insert 13. It will be appreciated that the nature of the plastic material affords sufficient resiliency to permit the lid to be easily positioned on or snapped off the insert 13.

As previously suggested, the section 15 is formed from tubular stock material which is readily available and relatively cheap in price. The top and bottom inserts 12 and 13 are the only parts to the bottle which involve any tooling costs and it will be appreciated, therefore, that any container of different size can be manufactured utilizing the same top and bottom inserts but a different length body section. Since the section 15 is formed from tubular stock material, whether round, square, rectangular, or any other desirable shape in cross section, this involves merely cutting a section to a specified length so as to get a bottle of a specified size. It will be appreciated also that a container of this type is extremely light in weight and, therefore, can be shipped at less cost than containers of the type presently in use and can be manufactured so as to be pleasing in appearance.

Figure 3:
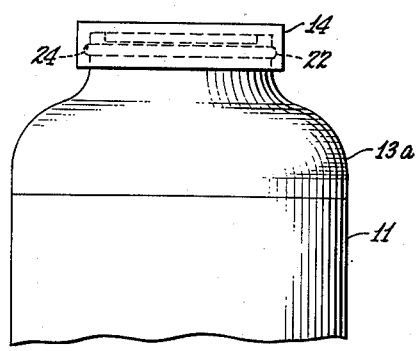
Fig. 3 is an elevational view, with parts removed, of a modification in design of the container shown in Fig. 1.

For instance, the top insert can be shaped as at 13a so as to give the resulting container the characteristic appearance of a Mason jar as shown in Fig. 3.

The overall appearance of the container can also be radically changed by a slight change in the length of the tubular body section and since different shaped containers are characteristically associated with different products, containers having the same shaped top and bottom inserts but different length body sections can be used for a number of different products and each size will still retain its characteristic shape.

What is claimed is:

1. A fabricated plastic bottle which can be formed of any pre-determined length having a body formed of a section of plastic tubular stock material cut to a specified length depending upon the size bottle desired and a paper body stock fixed to the outer peripheral surface of said section, a bottom insert having a peripheral rim telescoped in one end of said section and fixed therein in fluid tight relation, a tubular top insert having a neck telescoped into the other end of said section and fixed to the inner periphery thereof and a shoulder located against the edge of said body located adjacent said other end of said section and fixed thereto, the outer periphery of said shoulder being substantially flush with the outer periphery of the paper stock of said body, and a cap snap-fitted on the open end of said tubular top insert for sealing the open end thereof whereby a bottle of any pre-determined length can be formed by utilizing tubular stock material of varying lengths with the same tubular top insert design.

2. The invention defined in claim 1 further characterized by a label fixed to the outer peripheral surface of the paper stock and said shoulder being flush with the periphery of said label.

References Cited in the file of this patent

UNITED STATES PATENTS

| 1,875,231 | Foth et al. | Aug. 30, 1932 |
| 1,930,162 | Eckard | Oct. 10, 1933 |
| 2,172,544 | Panter | Sept. 12, 1939 |
| 2,290,348 | Moule | July 21, 1942 |
| 2,393,347 | Stuart et al. | Jan. 22, 1946 |
| 2,584,095 | Slaughter | Jan. 29, 1952 |
| 2,741,402 | Sayre | Apr. 10, 1956 |

FOREIGN PATENTS

| 810,794 | France | Jan. 6, 1937 |
| 457,262 | Italy | May 12, 1950 |
| 1,054,716 | France | Oct. 7, 1953 |